(No Model.)
J. M. HARPER.
HOSE PIPE CARRIER.
No. 484,961.  Patented Oct. 25, 1892.
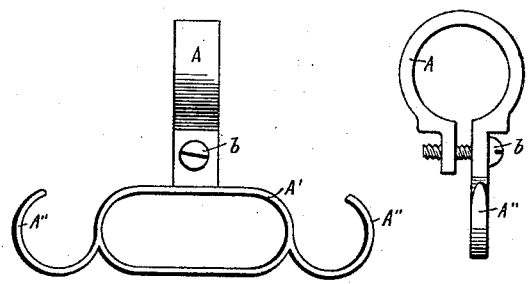
Witnesses:
Chas. E. Raabe,
R. N. McCormick
Inventor:
James M. Harper
by W. V. Tellt, Attorney.

UNITED STATES PATENT OFFICE.

JAMES M. HARPER, OF PEORIA, ILLINOIS.

HOSE-PIPE CARRIER.

SPECIFICATION forming part of Letters Patent No. 484,961, dated October 25, 1892.

Application filed January 7, 1892. Serial No. 417,241. (No model.)

*To all whom it may concern:*

Be it known that I, JAMES M. HARPER, a citizen of the United States, residing at Peoria, in the county of Peoria and State of Illinois, have invented certain new and useful Improvements in Hose-Pipe Carriers; and I do hereby declare that the following is a full, clear, and exact description of the invention, which will enable others skilled in the art to which it appertains to make and use the same.

My invention relates to certain new and useful improvements in hose-carriers, by means of which a hose-carrier is provided which is simple in construction, durable, and cheap in first cost.

More particularly my invention relates to a hose-carrier adapted especially for carrying or supporting small hose-pipe commonly used for sprinkling lawns or for watering flowers; but it may be used upon any size of hose when made of sufficient size to adapt it to the hose desired to be carried or supported.

My invention consists, essentially, of a circular clamp designed to fit around the body of the hose-pipe and provided with a suitable clamping means to unite the free ends of the clamp, which in this case is shown to be a screw, and of an extension from one of the ends of the clamp formed into a hand-hold with suitable hooks at either side.

That my invention may be more fully understood, reference is had to the accompanying drawings, in which—

Figures 1 and 2 show elevations of the clamp in which the hand-holds are shown integral with the circular clamps. Fig. 3 is also an elevation of the clamp in which the hand-hold is shown detachable therefrom.

In the figures, A designates the clamp, which is formed circular to fit over the hose-pipe, with lugs extending from the ends of the clamps, provided with threaded perforations or one of the lugs thereof threaded to receive the screw $b$.

A' is a hand-hold, or, more properly, a finger-hold, and A'' A'' are hooked extensions therefrom, also adapted for finger-holds. B and B' also designate a hand-hold, the same being shown in the drawings detachable from the hose-clamp and adapted to be secured to the said clamp by means of the screw $b$, bearing through perforations, threaded or otherwise, provided to receive said screw.

The clamp proper may be first made in one lineal piece, which may be afterward bent into the circular form herein shown, with the ends thereof brought as near together as may be desired to accommodate them to fit the small differences there may be in size of the class of hose upon which they are designed to be secured.

In use for the purpose designed the clamp is first secured upon the hose-pipe, and by means of the hand-hold provided the said hose is easily carried about without the disagreeable wetting that accompanies the carrying of the hose about in one's hands, and renders one entirely free from dirt and provides a very convenient means of handling the hose. The hooks A'' A'' enable the hose to be suspended upon any suitable rack provided by merely hooking the same over the said rack or over the limb of a tree or bush, so that it is not necessary to provide a hose-stand, and the lower portion of the clamp may be provided with a hook to adapt it to be suspended from that portion of the clamp, as might be useful in some instances.

It is designed that the hand-hold may be made integral with or detachable from the clamp for convenience; but the general form and detailed structure may be varied to suit the application of the clamp which may be desired to be used.

Having thus fully described my invention, what I claim, and desire to secure by Letters Patent, is—

1. In a hose-carrier, the circular clamp A, provided with perforated lugs at its free ends, and having the screw $b$, carried in the said perforations, as a clamping means, and having the hand-hold A', provided with the hooks A'' A'', all substantially as described and set forth.

2. The combination, in a hose-clamp, of the clamp A, provided with suitable lugs at its extremities, perforated, and one of the same threaded, with the hand-hold B, provided with the hook B′, and with the handhold provided with the perforation designed to bear, in connection with the perforations in the lugs, upon the clamp A, and the screw b, designed to secure the parts together and to provide a clamping means, all substantially as described and set forth.

In testimony whereof I affix my signature in presence of two witnesses.

JAMES M. HARPER.

Witnesses:
BOB MCCORMICK,
JOSIE TEFFT.